UNITED STATES PATENT OFFICE 2,102,134

FREEZING PROCESS FOR THE SEPARATION OF THE CONSTITUENTS OF LIQUIDS

Paul Schuftan, Munich, Germany

No Drawing. Application June 20, 1936, Serial No. 86,434. In Germany July 10, 1935

5 Claims. (Cl. 62—124)

In application Serial No. 749,666, filed October 23, 1934, in the names of Paul Schuftan, Ernst Karwat and Albrecht Steinbach, a method is described for the separation of the constituents of liquids such as fruit juices and milk involving, in general, transforming the liquids by freezing into a structurally stable mass, such as an annular or ring shaped body and then, without altering the shape of the mass, separating liquid from it by, for instance, the application of centrifugal force. This method depends upon the freezing of one constituent of the liquid into a more or less porous structure and the concentration of another constituent in the form of unfrozen liquid in the pores of the structure so that the frozen and unfrozen constituents can be separated by mechanical means.

The present invention is an improvement upon the process described in said application, designed to facilitate and improve the separation of the unfrozen constituent or concentrate from the frozen constituent. In accordance with the present invention the body of liquid under treatment is frozen by the application of cold to the freezing vessel until only a core of unfrozen liquid remains. The freezing of this core is then accomplished by equalization of the temperature within the mass and without further application of external cold. Due to the relatively low heat conductivity of the mass those portions thereof which are adjacent the cooling walls attain a considerably lower temperature than the more remote portions. As a result the portions of the mass adjacent the cooling walls freeze more nearly completely, leaving smaller pores for occupancy by and the escape of the liquid concentrate. Moreover, due to the cooling the liquid concentrate becomes more viscous. Both of these effects tend to hinder the separation of the liquid concentrate from the ice. This is particularly true with respect to the concentrate in portions of the mass remote from the surface at which the ice and liquid concentrate are finally separated from each other, i. e. adjacent the inner wall of an annular mass, because such concentrate must pass entirely through the mass in being separated. I have observed that in the case of liquids, such as milk, which contain colloidal constituents, the concentration of the liquid near the center of the mass, i. e. remote from the cooling walls, increases very little as the freezing progresses. Consequently the freezing occurs at substantially the same temperature throughout the mass. This explains why it is possible to transfer all of the cold required to freeze the entire mass during the freezing of only the outer portion of the mass and to freeze the inner portion by equalization of cold from the super-cooled outer portion to the liquid inner portion. It is therefore possible to use brine temperatures in the freezing process which are sufficiently low to accomplish a satisfactorily rapid freezing without loss of cold from the supercooled outer portion because only the outer portion is supercooled, leaving the inner portion liquid, and the latter is then frozen by transfer thereto of the excess cold from the outer portion.

In practical operation it is advisable to interrupt the application of cold only after a certain excess of cold necessary to freeze the entire mass has been introduced into the freezing cell. This excess of cold makes it possible by admitting heat during the equalization operation to adjust for unavoidable variations in the process. The equalization may be carried out by transferring the freezing cell after the application of a suitable excess of cold to it as described above, to a bath maintained at a temperature of about 2 to 4° higher than the equilibrium temperature between the frozen and unfrozen portions of the mass and leaving the freezing cells in this equalizing bath until the core of the mass is frozen and its temperature no longer falls but starts to rise. The temperature gradient in the mass, established in the freezing operation, is reversed in the equalizing operation using an equalization bath at above equilibrium temperature. This procedure results in a frozen mass having a very uniform distribution of porosity so that the separation of the liquid concentrate is facilitated.

The described procedure also greatly facilitates the washing of the ice mass following the separation of the concentrate by, e. g. centrifuging. The washing liquid must, of course, be less concentrated than the liquid to be removed from the ice mass, and will therefore have a higher freezing point. Without the equalization of the temperature of the ice mass as described the external surfaces would be colder than the equilibrium temperature between the liquid and solid phases of the mass, and the washing liquid, upon striking these external surfaces of the ice mass, would freeze and close the pores of the mass and thus interfere with or prevent the effective washing of the mass. As a result of the temperature equalization, however, the external surfaces of the ice mass are at a slightly higher temperature than the interior, and moreover very close to the equilibrium temperature, so that the washing of the mass is not interfered with by freezing of the washing liquid.

The method described above is capable of producing a highly homogeneous ice mass in the form of a hollow cylinder, but if the ice mass is made tapered or conical to facilitate its removal from the freezing cell there is a tendency for the lower and narrower part of the body of liquid to freeze completely by the time that the upper portion has frozen to the desired extent. This uneven freezing of the mass is objectionable because, for instance, the equalization operation described is substantially without effect on the lower, completely frozen part of the mass. This difficulty is avoided by regulating the amount of cold applied to the different parts of the freezing cell, e. g. by regulating the circulation of the cooling brine or by the application of insulation such as a coating of oil paint to the portion of the cell where the freezing otherwise would be too rapid.

It will be appreciated that by the present method of freezing and equalization, low temperatures may be applied in the freezing operation which otherwise would be objectionable. Thus whereas it is customary to concentrate a liquid in two stages by applying a lower freezing temperature in the second freezing stage than in the first because the liquid under treatment in the second stage is more concentrated than in the first stage, it is possible by the present process to apply a freezing temperature suitable for second stage operation to the liquid directly in the first stage. In this way one stage of freezing brine receptacles may be eliminated from the equipment. In other words, it is possible, due to the equalization procedure described, to accomplish substantially the same degree of separation between the components of the liquid in a single stage as heretofore has been customary in two stages. The process is especially useful in the first stages of a multistage process because in such first stages a small difference in temperature makes a relatively large difference in the amount of ice separated. By the present process an extensive separation of ice may be accomplished in a single stage without danger of loss of concentrate. In the later stages of the process the temperature gradient between the ice and the concentrate is greater so that accurate temperature control is not so important. In the final stages which result in the most concentrated product it may even be advantageous to freeze the liquid completely in the freezing cell and to forego the equalization operation which is of such pronounced utility in the earlier stages.

The temperature equalization operation may serve the additional useful purpose of loosening the ice mass from the wall of the freezing cell and facilitating its ready removal therefrom.

I claim:—

1. Process which comprises subjecting a liquid which contains at least two constituents which freeze at different temperatures to a freezing operation by applying cold through a surface of a mass of the liquid until at least one constituent thereof in that portion of said mass adjacent said surface is solidified and that portion of the mass remote from said surface is still fluid, discontinuing the application of cold to said mass and completing the freezing of said one component of the liquid throughout the mass thereof by permitting temperature equalization to occur between that portion thereof adjacent said surface and said still fluid portion remote from said surface, at least one constituent of the liquid being left fluid by said freezing operation, and mechanically separating said frozen constituent from said fluid constituent.

2. Process as defined in claim 1 in which the amount of cold applied to the mass of liquid is more than sufficient to freeze one constituent thereof throughout the entire mass.

3. Process as defined in claim 1 in which the amount of cold applied to the mass of liquid is more than sufficient to freeze one constituent of the liquid throughout the entire mass and in which the temperature equalization within the mass is permitted to take place while the surface of the mass through which cold was applied is exposed to a temperature slightly higher than the equalization temperature between the solid and liquid constituents to be separated.

4. Process as defined in claim 1 in which a mass of liquid in a freezing vessel is contacted with a freezing bath at a temperature materially below the equilibrium temperature between the constituents to be separated as solid and liquid until an amount of cold in excess of that required to freeze all of the constituent to be separated as solid has been applied, transferring the freezing vessel to a bath at a temperature slightly above said equilibrium temperature, and permitting temperature equalization within the mass to occur therein.

5. Process as defined in claim 1 in which the mass of liquid is subjected to the freezing operation in a freezing vessel in contact with a freezing bath and the temperature equalization within the mass is allowed to take place while the freezing vessel is held in contact with a bath at a temperature slightly above the equilibrium temperature between frozen and unfrozen constituents to be separated whereby the surface of said mass in contact with the freezing vessel is melted and the mass is thereby rendered readily removable from the freezing vessel.

PAUL SCHUFTAN.